(No Model.)

F. E. BOSS.
THILL COUPLING.

No. 537,180.  Patented Apr. 9, 1895.

Witnesses
Chas. H. Smith
J. Staib

Inventor
Fred E. Boss
per Lemuel W. Serrell
Atty.

UNITED STATES PATENT OFFICE.

FRED E. BOSS, OF NEW YORK, N. Y., ASSIGNOR TO ELLA MAY BOSS, OF SAME PLACE.

THILL-COUPLING.

SPECIFICATION forming part of Letters Patent No. 537,180, dated April 9, 1895.

Application filed May 19, 1894. Serial No. 511,738. (No model.)

*To all whom it may concern:*

Be it known that I, FRED E. BOSS, a citizen of the United States, residing in the city, county, and State of New York, have invented a new and useful Improvement in Thill-Couplings, of which the following is a specification.

In thill couplings as ordinarily constructed there occurs a looseness from wear which cannot readily be taken up owing to the absence of devices capable of tightening up the parts. Thill couplings have been made with spring and lever devices capable of taking up the looseness incident to wear, but these have departed from the well known form and have been complicated.

In carrying out my invention I employ in connection with the well known form of thill coupling, a screw stem projecting from the plate portion of the clip between the perforated lugs said screw stem being permanently connected at one end to the said plate portion, and a rotatable nut upon the screw stem adapted to be set up against the rubber block between the perforated lugs and press said block tightly against the eye end of the thill iron to prevent looseness in the connecting bolt and overcome unpleasant noise. I prefer to employ a presser plate between the rubber block and the rotatable nut and to form in the opposing faces of said parts coinciding projections and recesses to produce a locking effect.

Figure 1:
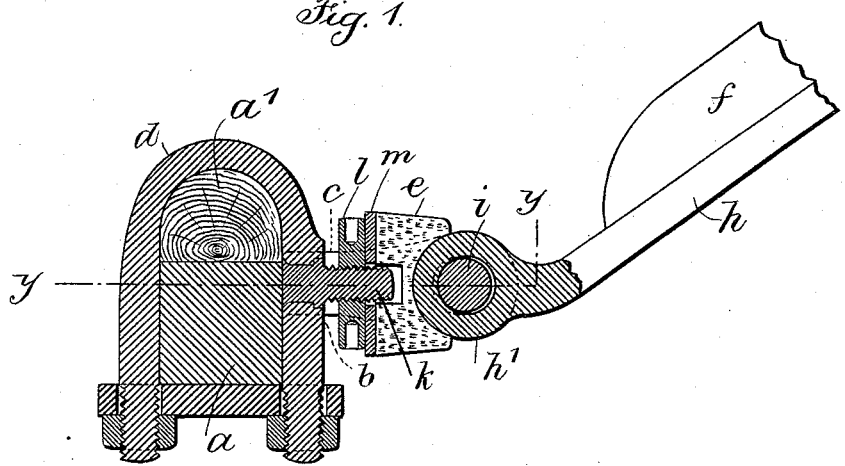
Figure 2:
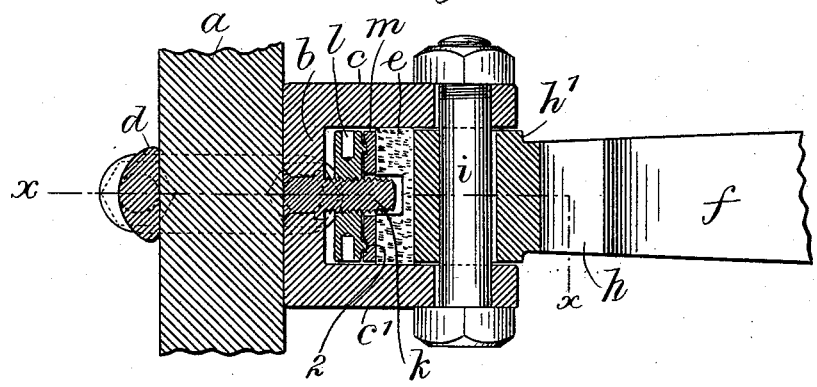

In the drawings, Figure 1 is a vertical longitudinal section at the line $x\,x$ of Fig. 2. Fig. 2 is a sectional plan at the line $y\,y$ of Fig. 1, and Figs. 3 and 4 represent the respective opposing faces of the rotatable disk and presser plate.

The metal portion of the fore axle is shown at $a$ and of the wooden surface portion at $a'$, and the clip is composed of the plate portion $b$, perforated lugs $c\,c'$, strap $d$, and the rubber block $e$ fits between the lugs $c\,c'$. A portion of the shaft or pole is represented at $f$ and the thill iron $h$ is connected thereto and has an eye $h'$ through which and the perforated lugs $c\,c'$ the bolt $i$ passes in securing the parts together. As the parts heretofore enumerated are of usual construction they do not require further description. The screw stem $k$ is secured to the plate portion $b$ and projects therefrom between the lugs $c\,c'$. I have shown and prefer to place the screw stem centrally between the lugs. Upon the screw stem $k$ is a rotatable nut $l$ and between the disk $l$ and the rubber block $e$ is a presser plate $m$. This presser plate $m$ has a central opening by which the said plate is passed over said stem, and I prefer to make a recess or opening in the rubber block to pass the same upon the stem in connecting the parts together, the rubber block being thus temporarily held in place.

Figure 3:
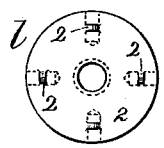
Figure 4:
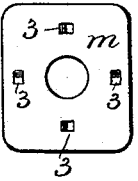

The nut $l$, I prefer to make with radial peripheral holes by which the disk is turned by a rod, and I prefer, and have so shown in Figs. 2, 3 and 4, to make projections 2 upon the face of the nut $l$ and recesses in the opposing face of the plate $m$ that coincide therewith.

The presser plate $m$ fits in between the lugs $c\,c'$ and bears against the back face of the rubber block $e$, and consequently cannot turn, and when the projections 2 of the nut $k$ are in the recesses 3 of the plate $m$, the plate maintains the nut in position and prevents it turning.

To insert the bolt $i$ in place and secure the shaft or pole to the clip, it is necessary to screw the nut $l$ back upon the stem $k$ to the face of the plate portion $b$ and push back the plate $m$ and rubber block $e$ upon said stem. Then after the shaft or pole is connected to the clip the nut $l$ is rotated to press the plate $m$ and rubber block $e$ forward and tighten the parts so that there is no slack that will allow movement and noise.

The presser plate and nut may be without projections and recesses and the presser plate might be dispensed with and the nut with projections engage the rubber block direct and still accomplish the purpose intended but not perhaps so effectively.

My improvements are adapted to be added to thill couplings already in use or on sale.

In cases where the screw has been used to set up the plate and coupling, the screw has been capable of detachment from the clip and liable to work loose and in setting up the rubber it is unscrewed and liable to be set up until it falls out. By attaching the screw rigidly at the back end to the clip it is not liable to become disconnected and it holds up the nut, the plate and the rubber by passing into them.

I claim as my invention—

1. The combination with the clip in a thill coupling, of a screw rigidly connected at its back end to the clip and projecting forward between the lugs, a nut upon such screw, a rubber block having a hole to set over the point of the screw and which block is compressed by the nut against the eye of the thill iron, substantially as specified.

2. The combination with the clip in a thill coupling, of a screw rigidly connected at its back end to the clip and projecting forward between the lugs, a nut upon such screw, a rubber block having a hole to set over the point of the screw, a plate between the rubber block and the nut and filling the space between the lugs of the clip, there being interlocking recesses and projections on the respective surfaces of the nut and plate substantially as specified.

Signed by me this 11th day of May, A. D. 1894.

FRED E. BOSS.

Witnesses:
GEO. T. PINCKNEY,
HAROLD SERRELL.